United States Patent Office

3,529,937
Patented Sept. 22, 1970

3,529,937
QUANTITATIVE ANALYZER OF SULFUR
CONTENTS
Takashi Ihara, Tokyo-to, and Kiyoshi Hoshino, Sagami-
 hara-shi, Japan, assignors to Kokusai Denki Kabushiki
 Kaisha, Minato-ku, Tokyo-to, Japan
Filed Feb. 24, 1967, Ser. No. 618,446
Claims priority, application Japan, Mar. 10, 1966,
41/14,271, 41/14,272
Int. Cl. G01n 27/00, 27/56, 31/06, 31/12
U.S. Cl. 23—253                                    9 Claims

ABSTRACT OF THE DISCLOSURE

A quantitative analyzer for analyzing the sulfur content of a sulfurous sample burned in a combustion chamber. The products of combustion are delivered through a heated conduit to an absorption cell containing an absorbing solution in which the gaseous sulfurous products are dissolved. The conduit is heated and maintained at a suitably high temperature to prevent attachment of the gaseous sulfurous products on the surface of the conduit and to prevent absorption of the gaseous sulfurous products by moisture present in the conduit. Means are also provided for recirculating the absorbing solution to uniformize its concentration.

---

This invention relates to a quantitative analyzer of sulfur contents in a sulfurous sample, such as metal, petroleum, ore etc., and more particularly to an apparatus for quantitatively analyzing sulfur contents in such a sample or samples in accordance with combustion analysis.

Sulfur contents included in steel increase generally the fragility of the steel and sulfur components included in gasoline reduce the life of the gasoline engine. Moreover, men and animals are in danger due to exposure to the sulfur components included in the waste gas which is exhausted from the gasoline engine. In addition, there are many instances in which the characteristic or circumference of the matter is subject to the influence of the sulfur components included in the matter. It is accordingly important to know the correct amount of the sulfur content included in the matter.

In conventional quantitative analyzers, there is provided a combustion chamber, a cell of absorbing solution, and a guide tube. The sample to be analyzed is put in a crucible, which is then inserted in the chamber. The combustion of the sample is carried out by heating the crucible by an electrical heating coil in the chamber into which oxygen is continuously supplied. As a result of the combustion, the sulfur contents included in the sample are derived, from the sample, in a gaseous sulfur dioxide ($SO_2$), sulfur trioxide ($SO_3$), etc. These derived gases are transferred in a flow of supplied oxygen through the guide tube and absorbed into the absorbing solution.

In the conventional apparatus, however, the termination of sulfur contents is generally carried out by manual operation, such as titration, in which a numerical calculation is necessary to obtain the analyzed result. Moreover, the gaseous sulfur components ($SO_2$ and $SO_3$ etc.) are liable to be attached to a body of low-temperature and to be absorbed into moisture. Accordingly, the conventional apparatus have undesirable characteristics in which a portion of the derived gaseous content tends to be attached to the guide tube which is at a relatively lower temperature and to be absorbed into the moisture, if any, attaching on the inner surface of the guide tube. As the result of such undesirable phenomena, all of the derived sulfur contents ($SO_2$ and $SO_3$ etc.) cannot be absorbed into the absorbing solution of the cell. Accordingly, the analyzed result is always lower than the correct value.

To avoid such erroneous measurement, the following operations are adopted in the conventional apparatus. (i) After the combustion of the sample, the guide tube is disjointed from the combustion tube. (ii) The sulfur components attached on the inner surface of the guide tube are laved with and absorbed into the absorbing solution. (iii) The laved guide tube is dried so as to completely remove the moisture.

As mentioned above, the conventional apparatus has disadvantages in that since the operation is considerably troublesome and the necessary time is relatively long, the conventional apparatus is undesirable to the sulfurous analysis in need of rapidity. Moreover, sequential analysis cannot be carried out without said disjunction of the guide tube. In addition to these disadvantages, the conventional apparatus has further disadvantage in that impalpable powders produced during the combustion adheres on the inner surface of the guide tube and the derived sulfur components are combined with the adhereing imparable powders. Accordingly, the analyzed result tends to have a lower value than the correct value.

An object of this invention is to provide a quantitative analyzer of sulfur contents in a sulfurous sample or samples in accordance with combustion analysis where a reliable analyzed result or results may be obtainable by simple operation.

Another object of this invention is to provide a quantitative analyzer of sulfur contents in a sulfurous sample or samples in accordance with combustion analysis where the operation can be carried out automatically.

The above-mentioned and other objects of this invention can be attained by an apparatus for quantitatively analyzing sulfur contents in a sulfurous sample by providing an apparatus which comprises a combustion chamber for burning the sulfurous sample in supplied oxygen to derive gaseous-sulfur components from the sample, a cell of absorbing solution for absorbing therein the gaseous-sulfur components, and a guide tube transferring the gaseous sulfur components from the combustion chamber to the cell of absorbing solution in an oxygen stream, whereby the quantitative analysis of the sulfur contents contained in the sulfurous sample is carried out by detecting the amount of the gaseous-sulfur components absorbed into the absorbing solution. The cell of absorbing solution is formed into a looped cell through which the absorbing solution is circulated and the guide tube inclusive of the connection portion between the guide tube and the looped cell is heated to an appropriate temperature. A check valve is provided within the guide tube and the oxygen is supplied to a portion of the guide tube between the connection portion and the check valve only when the supply of oxygen into the chamber is stopped.

The novel features of this invention are set forth with particularity in the appended claims, however this invention, as to its construction and operation together with other objects and advantages thereof, may best be understood by reference to the following description within, taken in connection with the accompanying drawings, in which the same parts are designated by the same characters, numerals and symbols as to one another, and in which:

Figure 1:
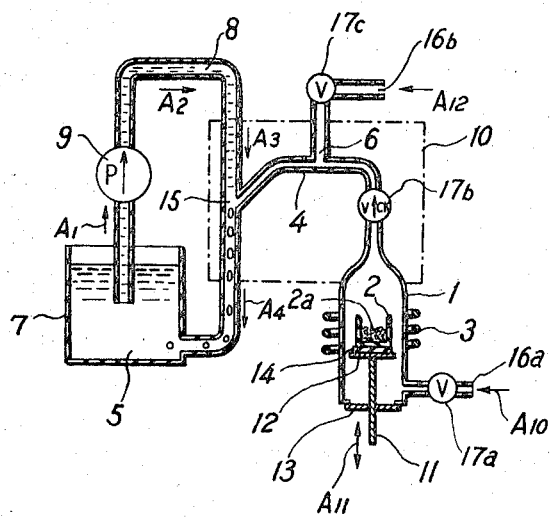
FIG. 1 is a sectional view illustrating the principal construction of the apparatus of this invention.
Figure 2:
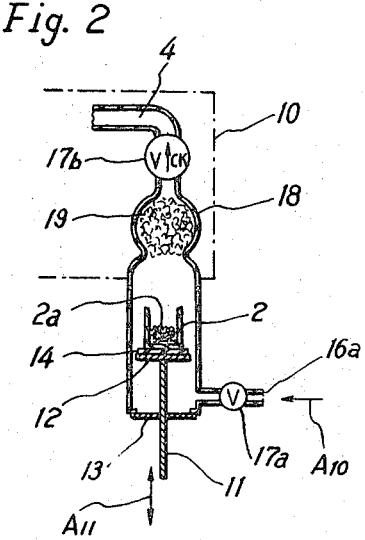
FIG. 2 is a sectional view illustrating a part of the apparatus of this invention.

Referring to FIG. 1, the principal parts of the apparatus comprise a combustion chamber 1, a cell of absorbing solution 7, a guide tube 4, heater means 10, a check valve 17b and inlets 16a and 16b connected to an oxygen supply. A sulfurous sample 2a held in a crucible 2 is inserted in the combustion chamber 1. The insertion of the crucible 2 into the chamber 1 is carried out in accordance with the known art, such as by means of a holder 12 and a hold bar 11 connected to the holder 12. A thermal insulator 14 is inserted between the crucible 2 and the holder 12. A cover 13 is employed for closing the chamber 1. Oxygen is supplied from an inlet 16a as shown by an arrow $A_{10}$ and introduced, through a valve 17a into the chamber 1. The sample 2a held in the crucible 2 is heated by a heating coil 3 which is energized by electric energy, e.g. high frequency electric energy. As a result of the combustion of the sulfurous sample 2a, the sulfur contents included in the sample 2a are derived in the state of gases of sulfur dioxide ($SO_2$) and of sulfur trioxide ($SO_3$) etc.

The derived gases are transferred into the cell 7 through the check valve 17b and the guide tube 4 by a flow of supplied oxygen. In this case, the cell of the absorbing solution 5 is formed into a looped cell which comprises a cell 7 and a looped tube 8 connected to the cell 7. The guide tube 4 is connected to a part of the looped tube 8 at a connection portion 15 and the check velve 17b is inserted in the guide tube 4 near the chamber 1, so that unidirectional transfer of the derived gases can be carried out, in the flow of the supplied oxygen from the guide tube 4 to the looped tube 8. The absorbing solution 5 is circulated in the looped cell by means of a pump 9 in the direction shown by arrows $A_1$, $A_2$, $A_3$ and $A_4$. The solution 5 is generally a one-tenth percentage (0.1%) dilution of hydrogen peroxide solution ($H_2O_2$).

The quantitative analysis of the sulfur contents included in the sample 2a is carried out by determining the amount of the gaseous-sulfurous component absorbed into the absorbing solution 5. This determination can be carried out in accordance with the known titration technique by use of the standard solution of sodium hydroxide after addition into the absorbing solution of a mixture of Methyl-Red and Methyl-Blue. Automatic detection will be described hereinafter.

In the apparatus of this invention, the guide tube 4 inclusive of the connection portion 15 between the guide tube 4 and the looped tube 8 is heated to an appropriate temperature, such as a few hundred degrees (200° C.~300° C.) on Celsius' thermal scale, by use of a heater 10 (shown in phantom lines). Since the gaseous-sulfurous components are not attached to a body of high temperature as mentioned above, all the gaseous sulfur components derived are transferred directly into the absorbing solution 5 without attaching on the inner surface of the guide tube 4 and the connection portion 15. Moreover, the gaseous sulfur components absorbed into a part of the absorbing solution 5 flowing through the looped tube 8 are mixed with all the absorbing solution 5.

In the quantitative analyzer of this type, the absorbing solution 5 must be maintained at a relatively low temperature (e.g., several ten degrees on Celsius' thermal scale) while the guide tube 4 inclusive of a connection portion between the guide tube 4 and the cell 7 of the absorbing solution must be maintained at a relatively high temperature (as mentioned above) to avoid attachment of the sulfur components on the inner surface of the guide tube 4. These requirements are generally inconsistent with each other. However, the apparatus of this invention is able to effectively meet these contradictory requirements by the formation mentioned above. Moreover, when the analysis operation is terminated and the chamber 1 is opened, the oxygen supplied from the inlet 16a through the valve 17a is stopped and the oxygen is then supplied from the inlet 16b through a valve 17c and an inlet 6 which is provided between the connection portion 15 and the check valve 17b. Accordingly, the absorbing solution 5 circulating in the looped tube 8 is never counterflown into the guide tube 4.

As mentioned above, impalpable powders such as iron oxide are produced during combustion in the combustion chamber 1 and transferred by the flow of the supplied oxygen into the absorbing solution 5. These impalpable powders adhere on the inner surface of the guide tube 4 and are further mixed with the absorbing solution 5. Acordingly, it is necessary to lave the adhering imparable powders and to exchange the aged absorbing solution 5 by a new solution after each analysis operation. This requirement is a large obstacle to perform an efficient and automatic operation of the apparatus. This difficulty can be avoided by the apparatus of this invention in which a bulge or enlarged portion 18 is provided in the guide tube 4 near the chamber 1. Filter material 19, such as asbestos or glass fiber which is heat-resistant, is inserted in the bulge 18. The bulge 18 is heated together with or separately with the guide tube 4 by the heater means 10. By adopting such formation, only the impalpable powders produced at the combustion are effectively filtered by the filter material 19 while the derived gases to be measured are smoothly passed through the filter material 19 without attaching thereto since it is heated to an appropriate temperature as mentioned above.

Figure 3:
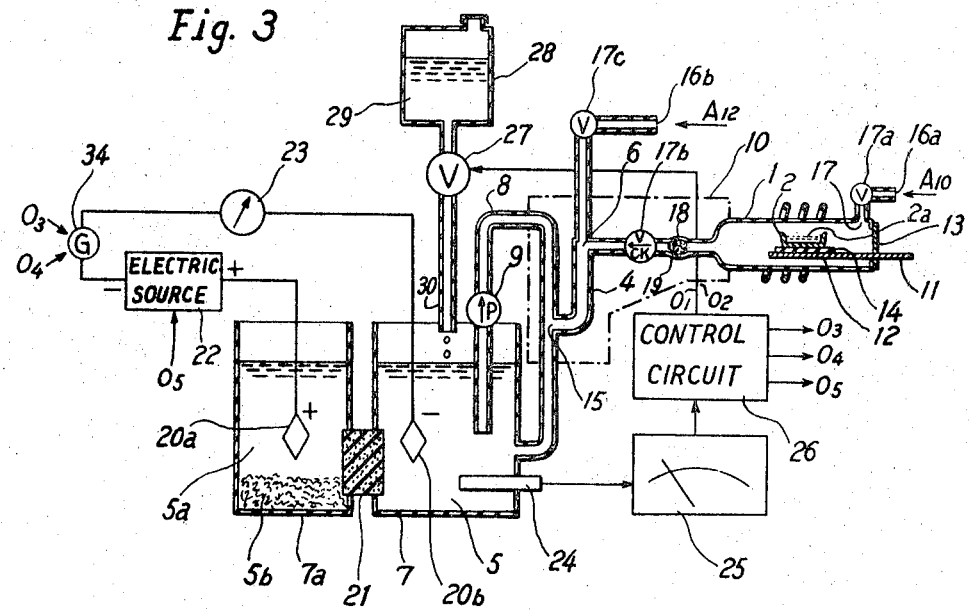
FIG. 3 is a diagrammatic view of one embodiment of an apparatus of this invention.

Referring to FIG. 3, an example of the apparatus of this invention in which automatic analysis operation can be performed will now be described. In this example, the sample 2a held in the crucible 2 is inserted in a horizontal position, but it may be designed similarly as shown in FIG. 1. A cell 7a is further provided which is separated from the cell 7 by a porous material 21. The absorbing solution 5 in the cell 7 is a solution inclusive of severalpercentage sodium sulfate and a small amount of hydrogen peroxide. The solution 5a in a cell 7a is the solution inclusive of sodium sulfate and a sufficient amount of sodium bicarbonate 5b ($NaHCO_3$), so that the sodium bicarbonate 5b is precipitated at the bottom of the cell 7a. Electrodes 20a and 20b are inserted into the cells 7a and 7 respectively. An electric source 22 of D.C. voltage is connected, through an AND gate 34 and a coulometer 23, to the electrodes 20a and 20b having the polarity illustrated. Accordingly, electric energy supplied from the electric source 22 electrolyzes the solutions 5 and 5a if the gate 34 is opened so that ions ($H^+$ and $SO_4^{--}$) are drifted to the electrode 20a or 20b through the porous material 21. A hydrogen ion concentration-meter of known type, which is composed of a detector 24 and an indicator 25, detects the change of the hydrogen ion concentration in the absorbing solution 5. The output of the hydrogen ion concentration-meter is applied to a control circuit 26 which detects the change of the output of the indicator 25 and generates outputs $O_1$, $O_2$, $O_3$, $O_4$ and $O_5$ as are mentioned below. These outputs $O_1$ and $O_2$ control the opening and the closing of a valve 27. When the valve 27 is opened, new hydrogen peroxide 29 is supplied from a storage cell 28 to the cell 5 through a guide tube 30. The output $O_3$ is generated after a delay time ($\tau$) from the starting time of the combustion to open the gate 34 and terminates when the hydrogen ion concentration (pH) is reduced below a threshold valve ($L_r$). The output $O_4$ opens the gate circuit 34 at an interval where the concentration (pH) is over the threshold level ($L_r$), in case of noncombustion. The output $O_5$ is applied to the electric source 22. The guide tube 4, the looped cell (5, 9, 8, 15) the check valve 17b, the bulge 18, the heater means 10 and the oxygen supply are similar to those of the apparatus shown in FIG. 1.

Figure 4:
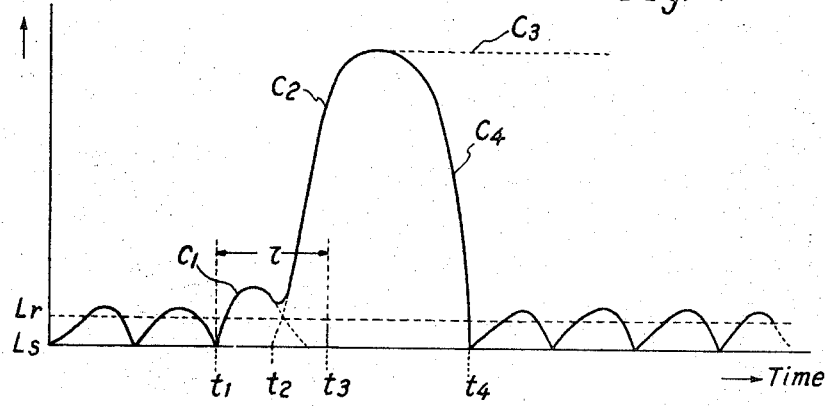
FIG. 4 is a characteristic curve describing the operation of the apparatus shown in FIG. 3.

Operation of the apparatus shown in FIG. 3 will be described with reference to FIG. 4. In case of no absorption of the gaseous sulfur components into the absorbing solution 5, the hydrogen ion concentration (pH) of the absorbing solution 5 is maintained at a constant value. If the gaseous sulfur components are generated as a result of combustion of the sample $2a$ and absorbed into the absorbing solution 5, the hydrogen ion concentration of the absorbing solution 5 suddenly increases since the gaseous-sulfur components becomes sulfuric acid due to the reaction with the hydrogen peroxide. These conditions are illustrated in FIG. 4. Before a time $t_1$, hydrogen ions generated by the impurities included in the supplied oxygen gradually change the concentration (pH) of the solution 5 but are drifted from the cell 7 to the cell $7a$ by the D.C. field applied by the electric source 22 since the output $O_4$ opens the gate 34 when the concentration (pH) is over the value ($L_r$). Accordingly, the hydrogen ion concentration of the absorbing solution 5 is substantially maintained at a standard value $L_s$ by this time $t_1$ although small changes occur. When the combustion of the sample $2a$ starts at the time $t_1$, carbonic acid gas ($CO_2$) generates at first so that the (pH) of the absorbing solution 5 changes along a curve $C_1$ as shown. However, this carbonic acid gas ($CO_2$) evaporates within a short time from the solution 5 so that the concentration (pH) of the solution 5 returns to the value $L_s$ after a short time (e.g. 2 or 3 seconds). At the time $t_2$, generation of the sulfur components from the sample $2a$ starts and the hydrogen ion concentration of the absorbing solution 5 suddenly increases along a curve $C_2$ and saturates as shown by a dotted line $C_3$. At a time $t_3$, the carbonic acid gas ($CO_2$) has evaporated as shown by the curve $C_1$. At this time $t_3$ delayed by a time ($\tau$) from the starting time $t_2$ of the combustion operation, the output $O_3$ opens the gate 34 so that the electric voltage from the source 22 is applied to the electrodes $20a$ and $20b$. Accordingly, the concentration (pH) decreases along a curve $C_4$ and coincides with the valve $L_s$ at a time $t_4$.

As a result of the above operation, the amount of the derived sulfurous component is determined by measuring the quantity of electricity supplied from the electric source 22 during the time $t_3$ to the time $t_4$. This measurement is carried out by use of the coulometer 23. If a pulse train each pulse of which corresponds to a change of hydrogen ion concentration, in case of $0.5 \times 10^{-6}$ gram of sulfur components, is generated from the electric source 22, one half the number of pulses of the pulse train indicates $10^6$ times the value of the sulfur contents included in a sample of one gram. This digital indication is convenient for rapidly and carrying out the measurement.

If the cycle of the pulse train is changed in accordance with the difference between the standard value $L_s$ and the instant hydrogen ion concentration (pH) of the absorbing solution 5, the access of the concentration (pH) to the level $L_s$ can more correctly be carried out. As mentioned above, the hydrogen ion concentration of the absorbing solution 5 decreases again below the threshold value $L_r$ after it increases. This decrease of the hydrogen ion concentration, from the threshold level $L_r$, occurs after its increase is detected as "the termination of the analysis" by the control circuit. In this case, the control circuit produces an output $O_1$ and opens the valve 27 so as to pass the predetermined amount of the hydrogen peroxide ($H_2O_2$) 29 to supplement the consumed absorbing material ($H_2O_2$). After "the termination of the analysis," the control circuit produces its output $O_2$ at a constant interval and controls the valve 27 so as to pass a small amount of the hydrogen peroxide ($H_2O_2$) 29. This additional supply of hydrogen peroxide 29 controlled by the output $O_2$ is carried out to compensate natural reduction of the concentration of the absorbing material ($H_2O_2$).

Figure 5:
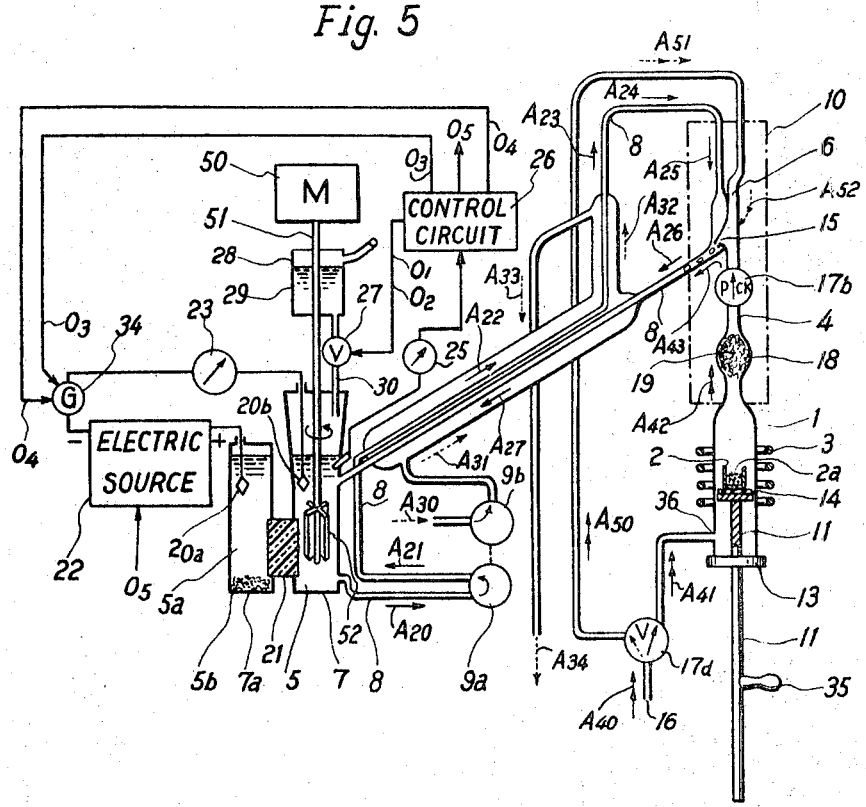
FIG. 5 is a diagrammatic view of another embodiment of an apparatus according to this invention.

Referring to FIG. 5, another embodiment of this invention will now be described. In this example, the looped tube 8, the oxygen supply system, the cooling means for the circulated absorbing solution, etc. are illustrated in detail. A pump $9a$ is employed for circulating the absorbing solution 5 through the looped tube 8 as shown by heavy line arrows $A_{20}$, $A_{21}$, $A_{22}$, $A_{23}$, $A_{24}$, $A_{25}$ and $A_{26}$. A pump $9b$ is employed for circulating the cooling water, as is shown by dotted arrows $A_{30}$, $A_{31}$, $A_{32}$, $A_{33}$ and $A_{34}$. These pumps $9a$ and $9b$ can be driven by a single motor. The cooling water effectively cools the absorbing solution 5 circulating in the looped tube 8. The oxygen supplied from an inlet 16 is directed, through a valve $17d$, to the chamber 1 when it is closed by the cover 13 or to the inlet 6 when the chamber 1 is opened. The opening or closing of the chamber 1 is controlled by a handle 35 connected with a bar 11. A motor 50 rotates a wing 52 connected through a shaft 51 to agitate the absorbing solution 5. Other means are similar with those of the embodiment of FIG. 3. Accordingly, the embodiment of FIG. 5 operates to carry out a semi-automatic operation of the quantitative analysis as to the sulfur contents included in the sample.

Since it is obvious that many changes and modification of the apparatus may be made without departing from the spirit of the invention, the scope of the invention is not to be limited to the details described above but by the description of the invention as defined in the appended claims.

What we claim is:

1. An apparatus for quantitatively analyzing sulfur contents in a sample, comprising; a combustion chamber for burning the sample in pressurized oxygen to derive gaseous-sulfur components from the sample; a looped cell containing absorbing solution capable of absorbing said gaseous-sulfur components; means for recirculating said absorbing solution through said looped cell to absorb therein the gaseous-sulfur components; a guide tube connected to said looped cell for transferring said gaseous sulfur components contained in said pressurized oxygen from the combustion chamber to the looped cell containing said absorbing solution; a check valve positioned in the guide tube to allow fluid flow in a direction from the chamber to the looped cell; means for applying pressurized oxygen to a portion of the guide tube between the check valve and the connection portion of the guide tube to the looped cell; and heater means for heating the guide tube inclusive of the connection portion between said guide tube and said looped cell.

2. An apparatus according to claim 1, in which the guide tube is provided with an enlarged portion near the combustion chamber, and a heat-resistant filter material positioned in said enlarged portion and heated by the heater means.

3. An apparatus according to claim 1, in which the apparatus is further provided with a storage cell for storing hydrogen peroxide, a guide tube connecting the storage cell to the cell of absorbing solution and having valve means therein for controlling the flow of hydrogen peroxide to said absorbing cell, and control circuit means for controlling the operation of said valve means to pass a predetermined amount of hydrogen peroxide in response to an output signal of a hydrogen-ion concentration meter having a detector which is inserted in the cell of absorbing solution.

4. An apparatus according to claim 1, in which the apparatus is furtheer provided with another cell separated from said cell of absorbing solution by a porous material, two electrodes each positioned in one of said cells, means for applying a DC voltage across said electrodes, and means for measuring the current flow through said electrodes operative after a predetermined time from a time when the hydrogen ion concentration of the absorbing solution exceeds a predetermined threshold value just after starting of the combustion of the sample and terminating when the hydrogen ion concentration of the absorbing solution decreases below said threshold value.

5. An apparatus according to claim 4, in which said means for applying a DC voltage includes means for generating a pulse train the cycle of pulses of which is proportional to the difference between the instantaneous hydrogen ion concentration of the absorbing solution and a standard ion concentration of the absorbing solution.

6. An apparatus for use in quantitatively analyzing the sulfur content of a sulfurous sample comprising: means defining a combustion chamber for burning a sulfurous sample and deriving therefrom pressurized gaseous sulfurous products of combustion; means defining an absorption cell containing an absorbing solution capable of absorbing said gaseous sulfurous products; conduit means providing fluid communication between said combustion chamber and said absorption cell for injecting said pressurized gaseous sulfurous products into said absorbing solution, and heating means for heating and maintaining the temperature of said conduit means at a temperature effective to prevent both attachment of said gaseous sulfurous products to interior surfaces of said conduit means and absorption of said gaseous sulfurous products by any moisture present in said conduit means.

7. An apparatus according to claim 6; including means for recirculating said absorbing solution to uniformize its concentration.

8. An apparatus according to claim 6; including supply means for supplying a pressurized fluid to said conduit means to prevent backflow of said absorbing solution into said combustion chamber when said combustion chamber is inoperative; and a check valve positioned in said conduit means upstream from said supply means to prevent flow of said pressurized fluid into said combustion chamber.

9. An apparatus according to claim 8; including means for recirculating said absorbing solution to uniformize its concentration.

References Cited

UNITED STATES PATENTS

| 2,669,504 | 2/1954 | Halvorson et al. |        |
|-----------|--------|------------------|--------|
| 2,888,332 | 5/1959 | Aites.           |        |
| 2,949,345 | 8/1960 | Clauss.          |        |
| 3,367,747 | 2/1968 | Sieth et al.     | 23—254 |
| 3,428,433 | 2/1969 | Ehrenberger et al. |      |

OTHER REFERENCES

Hagerman: "Determination of Sulfur by Combustion in a Vertical Tube," Analytical Chem., vol. 19, No. 6, June 1947, pp. 381–383.

Agazzi et al.: "Microdetermination of Sulfur and Halogens by Rapid Automatic Combustion," Analytical Chem., vol. 30, No. 9, September 1958, pp. 1566–1568.

MORRIS O. WOLK, Primary Examiner

R. E. SERWIN, Assistant Examiner

U.S. Cl. X.R.

23—230, 232, 254